United States Patent Office 3,439,932
Patented Apr. 22, 1969

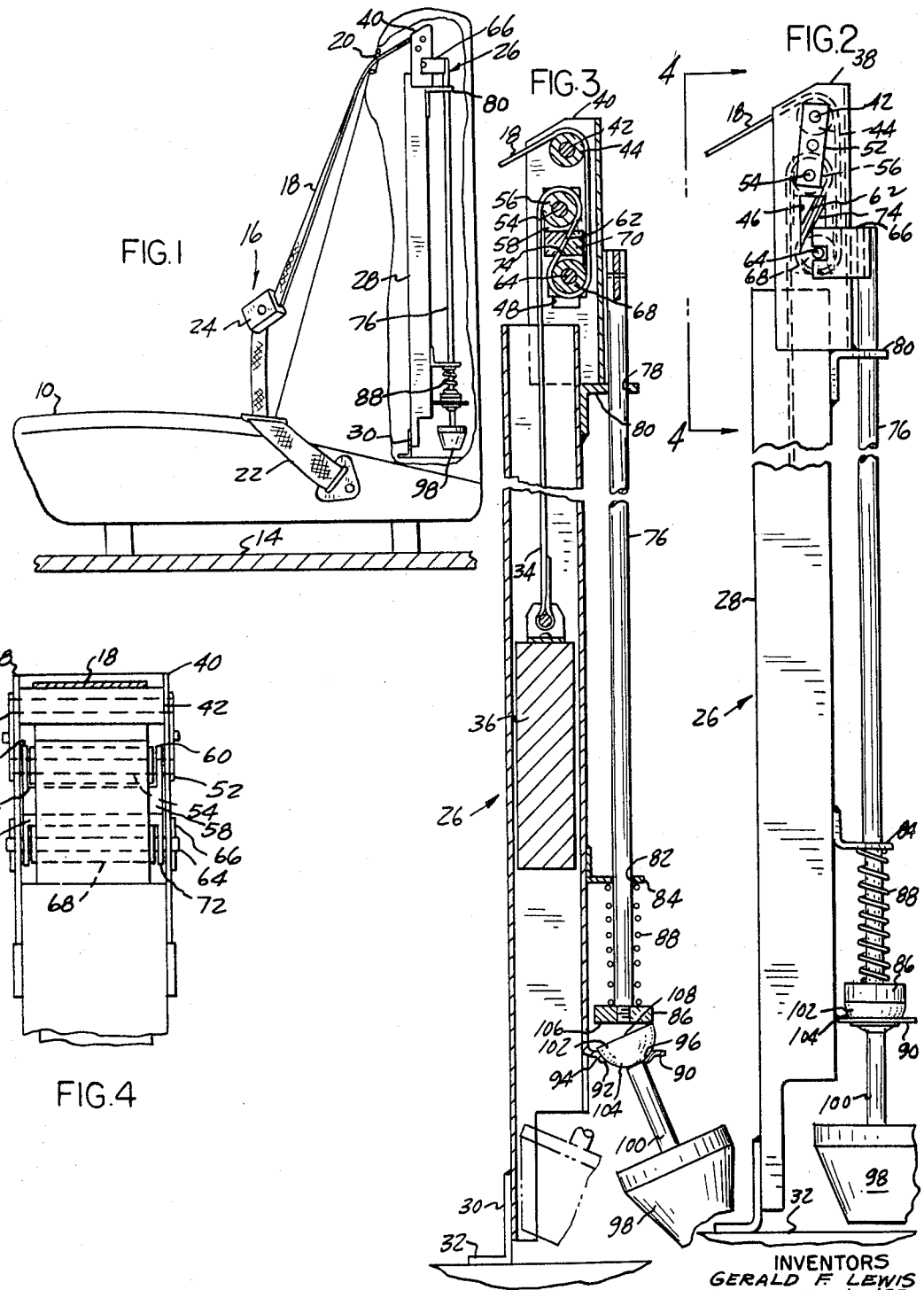

3,439,932
BELT RETRACTING DEVICE WITH PENDULUM ACTUATED LOCKING MEANS
Gerald F. Lewis, Berkley, David P. Jones, Detroit, and Ronald J. Palmieri, Harper Woods, Mich., assignors to Jim Robbins Seat Belt Co., Royal Oak, Mich.
Filed Apr. 21, 1967, Ser. No. 632,750
Int. Cl. B60r 21/10; A47d 15/00; A62b 35/00
U.S. Cl. 280—150    8 Claims

ABSTRACT OF THE DISCLOSURE

A vehicle safety seat belt having an operating section freely extending from a stored position to accommodate the normal movements of the occupant of the seat. A counterweight attached to the stored end of the belt is movable between raised and lowered positions in a storage tube to uniformly bias the extended end of the belt toward the stored position.

A pair of belt clamping members are connected through a motion transmitting linkage to an actuating pendulum. A sudden force acting on the vehicle and displacing the pendulum from a position of equilibrium causes the clamping members to rigidly anchor the belt to a fixed part of the vehicle.

BACKGROUND OF THE INVENTION

Field of the invention

This invention relates to devices for controlling the movement of a vehicle safety seat belt and more specifically to a device permitting a relatively unrestrained extension and retraction of the belt to accommodate normal movements of the occupant with locking means, actuated by the displacement of a pendulum from an equilibrium position, and operable to restrain the belt against an uncontrolled extension.

Description of the prior art

Seat belt arrangements are rapidly becoming a standard accessory in automotive vehicles as a means for restraining the occupant of the seat from a sudden displacement away from the seat when violent forces act on the vehicle such as are caused by collisions and the like. Although it is widely accepted that such belt restraining systems when used, are effective in reducing an injury producing impact between the occupant and various unyielding portions of the vehicle interior, there is a general reluctance on the part of the public to actually utilize such belt systems when the vehicle is being operated. One reason for this reluctance is the inconvenience of conventional seat belt arrangements which restrain normal movements of the occupant. Such belt arrangements have a fixed operating length so that if the occupant desires to perform a normal movement requiring a displacement of his body from his normal seated position, he must either disengage the joined sections of the belting or else adjust the belting to provide sufficient slack to accommodate the movement.

To overcome this disadvantage and provide the occupant with greater freedom of movement during normal riding, various systems have been disclosed in the prior art with the belting relatively freely extendible from a stored position and having spring-biased retractor means urging the belt toward the stored position. Thus, the occupant has greater freedom of movement to perform normal bodily motions. Such devices employ a belt clamping device generally actuated by the movement of an inertia member so that in the case of a sudden deceleration of the vehicle the belt is locked against extension to a fixed part of the vehicle so that the occupant is restrained against movement from his seated position.

However, belt retracting devices with inertia actuated belt locking devices of the prior art have not been generally accepted because they require a great number of component parts and are costly to assemble.

One device of this type of the prior art is disclosed in Patent No. 2,825,581 issued to G. L. Knight, Mar. 4, 1958. The Knight patent discloses a belt take-up device with a pendulum actuated locking means. Displacement of the pendulum member from its normal position of equilibrium in reaction to a sudden deceleration of the vehicle actuates electrical locking means mounted in a belt take-up device and which are operable to lock the take-up device to prevent further extension of the belt.

The present invention obviates the problems of the prior art by providing a pendulum actuated locking means, separate from the belt retracting means with both the retracting and locking means comprising a relatively few easily assembled and reliable mechanical components.

SUMMARY

The preferred embodiment of the present invention, which will be subsequently described in greater detail is described with reference to a vehicle having a seat assembly and a belt arrangement to control the displacement of an occupant of the seat. An elongated section of belting is extendible from a stored position in the back section of the seat assembly to accommodate the normal movements of the occupant.

A counterweight attached to the stored end of the belt is arranged for movement between raised and lowered positions in an upright storage tube so that a uniform retracting force is at all times applied to the belt. The retracting force of the counterweight permits the occupant to freely extend the belt with a nominal pull-out force.

In addition to its inherent simplicity and extreme reliability, the counterweight arrangement provides a uniform retracting force on the belt throughout the entire extended movement of the belt. As is well known, conventional spring-biased retracting means provide a non-uniform retracting force because of the variable nature of their stress-deflection ratio throughout their deflection range.

The belt is guided through a pair of normally spaced apart clamping members including a fixed member and a movable member. A pendulum suspended by a rigid rod to a support section forming a fixed part of the vehicle normally assumes an equilibrium position with respect to the support section. The pendulum has a mass such that an exterior force producing a sudden change in the momentum of the vehicle in any horizontal direction displaces the pendulum from its equilibrium position. A motion transmitting linkage transmits the pendulum displacement to the movable clamping member so that the clamping members are engaged to anchor the extended operating end of the belt to a fixed part of the vehicle.

The pendulum actuated belt locking arrangement illustrating the preferred embodiment of the invention has several advantages over the prior art including the fewer number of component parts and inherent reliability of a mechanical linkage between the pendulum and the locking members. In addition, the employment of a counterweight retractor to bias the belt toward the stored position provides a uniform retracting force on the belt between is fully extended and fully retracted positions.

It is therefore an object of the present invention to provide an improved actuating means for locking an extendable vehicle safety seat belt to a fixed part of the vehicle upon the occurrence of an event producing a sudden change in the momentum of the vehicle by providing a belt locking means, a pendulum member displaceable from a position of equilibrium upon a sudden change in vehicle momentum and mechanical, motion-transmitting linkage between the pendulum and the locking means operable to actuate the belt locking means.

It is another object of the present invention to provide a seat belt device permitting the belt to freely extend from a stored position to accommodate movements of the occupant with retracing means taking up any slack in the belt and belt clamping means for anchoring the belt to a fixed part of the vehicle upon the occurrence of an event producing a sudden change in the momentum of the vehicle, the belt clamping means actuated towards a belt clamping engagement by the movement of a pendulum member supported for universal movement to a fixed part of the vehicle and displaceable from a normal position of equilibrium upon a predetermined change in vehicle momentum.

It is still a further object of the present invention to provide a vehicle safety seat belt clamping means responsive to the displacement of an inertia member with respect to a position of equilibrium, the inertia member displaceable from its position of equilibrium upon the application of a force on the vehicle producing a sudden change in vehicular momentum and automatically returnable to its position of equilibrium when the force has been dissipated.

Still further objects and advantages of the present invention readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 illustrates a side elevational view of a vehicle seat assembly employing an occupant restraining belt system, with the extension of a section of the belt system controlled by a lockable retracting device illustrating the preferred embodiment of the present invention;

FIG. 2 is an enlarged view of the belt retracting device illustrated in FIG. 1 with the pendulum disposed in its position of equilibrium;

FIG. 3 is an elevational sectioinal view of the preferred device illustrating the pendulum displaced from its position of equilibrium; and FIG. 4 is a view taken along lines 4—4 of FIG. 2.

DESCRIPTION OF THE PREFERRED EMBODIMENT

Now referring to the drawings, a seat assembly comprising a horizontal supporting section 18 and a back supporting section 12 are rigidly mounted to the floor 14 of a vehicle. A belt restraining system 16 is employed to encircle an occupant of the seat assembly and control of the displacement of the occupant with respect to his seated position. The belt assembly 16 includes an elongated relatively nonstretchable belt section 18 having its lower end anchored to the seat portion 10 and its upper end extending through an aperture 20 in the back supporting portion 12 of the seat. The belt restraining system 16 also includes a section of belt 22 having its lower and securely anchored to the opposite side of horizontal seat portion 10 and its opposite end engageable with a buckle 24 carried by belt 18 so that the torso of the occupant is encircled by the joined belt sections 18 and 22.

Now referring to FIGS. 2 and 3, the upper section of belt 18 is engaged with a retracting apparatus 26 mounted in the back supporting portion 12. The retracting device 26 comprises a substantially rectangular upright elongated tube 28 having its lower end rigidly mounted by an angle 30 to a relatively fixed part 32 of the vehicle. The lower terminal end 34 of the belt 18 is attached to a counterweight 36. The counterweight 36 has a cross section slightly smaller than the bore of the tube 28 and is disposed therein for vertical movement. The counterweight 36 has a predetermined weight so that it applies a uniform tensile retracting force on the belt 18 at all times while permitting the occupant of the seat to perform normal body movements by applying a nominal pull-out force on the belt 18. When the occupant resumes his rearward position, the slack in the belt 18 is taken up by the counterweight 36 withdrawing the belt toward a stored position within the ube 28. Thus, it is to be understood that the tube has a height providing a substantial extension and retraction of he belt. It is further to be noted that the belt is stored in a linear position within the tube.

A pair of spaced apart support members 38 and 40 are fixed to the upper ends of the tube 28. A shaft 42 is journaled in the support members 38 and 40 and supports a guide roller member 44 for rotation about an axis transverse to the movement of the belt 18.

An elongated slot 46 is provided in the support member 36 below the roller 44 and registers with a corresponding slot 48 in the support member 40. A pair of elongated support sections 50 and 52 fixed to the outer sides of the support sections 38 and 40 support a shaft 54 below the roller 44. The shaft 54 supports a short roller 56 for rotation about an axis parallel to their axes of rotation of the roller 44.

An upper clamping member 58 having a pair of upwardly directed arms 60 is carried by the shaft 58 and depends downwardly from the shaft 58. The clamp 58 has a tapered section providing a clamping surface 62.

A lower shaft member 64 extends through the slots 46 and 48 with its opposite ends journaled in a yoke 66. The shaft 64 carries a short roller 68 for rotation parallel to the axis of rotation of the roller 44 and below the roller 56. A lower clamping member 70 has a pair of short arm sections 72 carried by the shaft 64 and slidably disposed in slots 46 and 48 for up and down movement. The lower clamping member also is tapered to provide a clamping surface 74 facing the clamping surface 62.

The belt 18 is wrapped over the upper roller 44, down and around the lower roller 68 and up and around the roller 56 and then downwardly towards the storage tube 28. The slots 46 and 48 have a length permitting the lower roller 68 and the lower clamping member 70 to move between a lower position where the clamping surfaces 62 and 74 are spaced apart from one another, and an upper portion where they are closely adjacent one another. The belt 18 passes freely between the clamping members 58 and 70 when the clamping members 58 and 70 are in a spaced apart position illustrated in FIG. 2 but is clamped against movement when the lower clamping member 70 has moved upwardly sufficient to engage the belt between the clamping surfaces 62 and 74.

The U-shaped yoke 66 is fixed to the upper end of an elongated actuating rod 76 supported for vertical movement by an aperture 78 provided in an upper support member 80 and a second aperture 82 provided in a lower support member 84, the support members 80 and 84 being rigidly fixed to the storage tube 28. A circular retainer member 86 is threadably engaged to the lower end of the actuating rod 76. A cylindrical helical spring 88 acts between the lower support member 84 and the retainer 86 so that the rod 76 is biased in a downwardly direction.

The rear lower wall of the storage tube 28 is bent outwardly to form a horizontal supporting section 90. Preferably, an aperture 92 is formed in a dished portion 94 of the support. The dished portion 94 has an upper spherically concave bearing surface 96 arranged below the retainer 86 of the actuating rod 76.

An inertia member 98 having a predetermined mass has a rigid supporting rod 100 and a supporting section 102. The supporting section 102 has a spherically convex bearing surface 104 seated in the spherically concave bearing surface 96. Thus, the inertia member 98 is supported so that it normally is in a positon of equilibrium below the engaged bearing surfaces 96 and 104. This position is influenced by the force of gravity acting on the mass of the member 98 and the spring 88 acting downwardly so that the lower flat surface 106 of the retainer 86 acts against an upper flat surface 108 of the supporting section 102.

The inertia member 98 is displaceable from its position of equilibrium illustrated in FIG. 2 to a lateral position with respect to the bearing surfaces. This lateral displacement can result from a lateral force tending to suddenly increase or decrease the momentum of the vehicle so that the mass of the inertial member 98 acting under its independently supported inertia produces relative movement between the member 98 and its fixed support 90.

It is to be understood that the pendulum is supported for universal movement, that is to say that it will swing in any vertical plane passing through its axis of rotation so that it reacts in response to a lateral change in the momentum of the vehicle as well as sudden accelerations or decelerations of the vehicle.

As the number 98 is displaced from its position of equilibrium, the supporting section 102 pivots so that the surfaces 106 of the retainer and the flat surface 108 of the support 102 are displaced from a face-to-face relationship to an angular relationship so that the actuating rod 76 moves vertically upward. As hereintofore described, upward movement of the rod 76 moves the lower belt clamping member 70 into belt clamping engagement with the upper belt clamping member 58.

Unlike some of the inertial locking devices of the prior art, the preferred embodiment of the present invention automatically releases the belt when the violent forces producing engagement of the clamping members 58 and 70 has been absorbed or in some other manner dissipated. This releasing effort is achieved by the spring 88 which produces a force tending to separate the clamping members by urging the actuating rod 76 downwardly. This release effort also urges the member 98 toward its equilibrium position. This feature has obvious advantages in the event of a collision where the occupant is physically incapacitated, the belt automatically extends a distance sufficient to permit his separation from the seat assembly.

We claim:

1. In a vehicle having a seat with a back, a seat belt system comprising:
    (a) an elongated seat belt;
    (b) a coupling element carried on one end of the belt;
    (c) an elongated support mounted in the vehicle in an upright position adjacent the back of the seat;
    (d) a weight of a predetermined mass connected to the opposite end of the belt with respect to the coupling element, and mounted on the support to bias the belt toward a retracted position, the weight being movable along the support in either a first direction to move the belt toward its retracted position, or in the opposite, second direction to allow the belt to be extended from its retracted position;
    (e) a clamping member mounted on a support for motion with respect to the belt between a first position in which it is engageable with the belt to prevent the belt from being extended from its retracted position, and a second position in which it is inoperable to prevent motion of the belt;
    (f) a bias member connected to the clamping member for urging the clamping member toward its second position;
    (g) a pendulum suspended in the vehicle for a motion between a position of equilibrium and a second position in which it is moved with respect to the vehicle, the pendulum being connected to the clamping member such that the clamping member is moved toward its first position as the pendulum is moved with respect to the vehicle from its position of equilibrium.

2. A seat belt device as defined in claim 1, wherein said belt is movable with the weight between a fully extended position and a fully stored position, and said weight applies a uniform tensile force on said belt as said belt is moved between said fully extended position and said fully stored position.

3. A seat belt system as defined in claim 1, in which the elongated support comprises a tube supported in an upright position, the tube having an opening adjacent its upper end for receiving the belt into the tube, and the weight is suspended in the tube on the end of the belt to bias the extended end of the belt toward the opening and into the tube.

4. A seat belt system as defined in claim 1, in which the clamping member is mounted on the upper end of the support; the pendulum is mounted on the lower end of the support; and including an elongated link mounted adjacent the support for motion in directions parallel to the support, the upper end of the link being connected to the clamping member, and its lower end being connected to the pendulum such that as the pendulum is moved with respect to the vehicle, the clamping member is moved by the link toward its first position.

5. A seat belt system as defined in claim 1, in which the bias member is connected to the pendulum to urge the pendulum toward its position of equilibrium.

6. A seat belt system as defined in claim 1, in which the support is enclosed within the back of the seat such that the belt can be extended from its retracted position to form a shoulder restraint for an occupant of the seat.

7. In a vehicle having a seat with a back, the combination comprising:
    (a) an elongated seat belt;
    (b) a coupling element carried on one end of the belt;
    (c) an elongated support enclosed within the back of the seat, and supported in a generally upright position with its upper end adjacent the upper portion of the back;
    (d) a weight connected to the opposite end of the belt, and mounted on the support for motion along the support in either a downward direction to bias the belt toward a retracted position, or in an upward direction to allow the belt to be extended from its retracted position;
    (e) a clamping member mounted on the upper end of the support for motion between a first position in which it is engageable with the belt to prevent the belt from being extended from its retracted position, and a second position in which it is inoperable to prevent the belt from being moved;
    (f) a pendulum suspended on the support such that it is displaceable from a position of equilibrium toward a second position in a motion in which the pendulum is moved with respect to the vehicle, the pendulum being connected to the clamping member toward its first position as the pendulum is moved toward its second position in said motion; and
    (g) a spring connected between the clamping member and the pendulum to bias the clamping member toward its second position and to bias the pendulum toward its position of equilibrium.

8. In a vehicle having an elongated seat belt, retractor means connected to the belt for biasing the belt toward a retracted position, and for allowing the belt to be extended from its retracted position, the combination comprising:
    (a) a support;
    (b) a clamping member mounted on the support for motion between a belt-engaging position in which it is engageable with the belt to prevent the belt from being extended from its retracted position, and a belt-release position in which it is inoperable to prevent the belt from being extended;
    (c) an inertia member of a predetermined mass;
    (d) a rod having one end connected to the inertia member and its other end provided with a spherically concave surface;

(e) a socket mounted on the support and provided with a spherically convex bearing surface seating the bearing surface of the rod to support the rod such that the inertia member is movable with respect to the vehicle toward and away from a position of equilibrium;

(f) a link connecting the inertia member and the clamping member to move the clamping member toward its belt-engaging position, as the inertia member is moved away from its position of equilibrium; and (g) a bias member connected to the link to bias the inertia member toward its position of equilibrium, and the clamping member toward its belt-release position.

References Cited

UNITED STATES PATENTS

| 2,622,664 | 12/1952 | Koehler et al. | 244—122.2 X |
|---|---|---|---|
| 2,649,145 | 8/1953 | McCarthy | 244—122.2 X |
| 2,776,093 | 1/1957 | Cox et al. | 242—47.5 |
| 3,231,307 | 1/1966 | Smith | 297—388 |
| 3,257,146 | 6/1966 | Mahoney | 297—388 |
| 3,343,765 | 9/1967 | Baker | 242—107.4 |

LEO TRIAGLIA, *Primary Examiner.*

J. E. SIEGEL, *Assistant Examiner.*

U.S. Cl. X.R.

297—388, 389